(12) United States Patent
Harman et al.

(10) Patent No.: US 9,053,099 B2
(45) Date of Patent: Jun. 9, 2015

(54) METHOD FOR VALIDATING EQUIVALENT DATA STRUCTURES

(75) Inventors: David Harman, Winchester (GB); Brian Johnson, Winchester (GB); Alan Clive Robinson, Winchester (GB); Andrew Wright, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 13/191,401

(22) Filed: Jul. 26, 2011

(65) Prior Publication Data

US 2012/0041932 A1 Feb. 16, 2012

(30) Foreign Application Priority Data

Aug. 11, 2010 (EP) .................................... 10172515

(51) Int. Cl.
*G06F 7/00* (2006.01)
*G06F 17/30* (2006.01)
*G06F 9/44* (2006.01)
*G06F 9/45* (2006.01)

(52) U.S. Cl.
CPC *G06F 17/30* (2013.01); *G06F 8/10* (2013.01); *G06F 8/437* (2013.01)

(58) Field of Classification Search
CPC ................... G06F 17/30342; G06F 17/30569
USPC .......... 707/694, 791, 809, 810; 717/116–124, 717/147–149, 157, 159
See application file for complete search history.

(56) References Cited

U.S. PATENT DOCUMENTS

| | | | | |
|---|---|---|---|---|
| 4,734,854 A | * | 3/1988 | Afshar ........................... | 717/107 |
| 5,768,564 A | * | 6/1998 | Andrews et al. ............... | 717/137 |
| 6,467,079 B1 | * | 10/2002 | Ettritch et al. ................ | 717/108 |
| 7,240,338 B1 | * | 7/2007 | Bell et al. ...................... | 717/137 |
| 7,386,840 B1 | * | 6/2008 | Cockerham et al. .......... | 717/137 |

* cited by examiner

*Primary Examiner* — Anh Tai Tran
(74) *Attorney, Agent, or Firm* — Rabindranath Dutta; Konrad, Raynes, Davda and Victor LLP (57) ABSTRACT

Embodiments of the invention relate to a method, system, and computer program product for validating a data structure, comprising: responsive to identifying a data structure in a first programming language, identifying an equivalent data structure in a second programming language; comparing a data definition of the data structure with a data definition of the equivalent data structure; determining an incompatibility between a compared data definition of the data structure and a compared data definition of the equivalent data structure; and responsive to determining an incompatibility, identifying a rule defining an action to be taken in order to correct the incompatibility.

19 Claims, 6 Drawing Sheets

DSECT Data Definition

| | | |
|---|---|---|
| ITEM1 | DS | CL8 |
| ITEM2 | DS | X |
| ITEM3 | DS | X |
| ITEM4 | DS | H |

PL/1 Copybook

| | | |
|---|---|---|
| ITEM1 | CHAR | (8) |
| ITEM2 | BIN FIXED | (8) |
| ITEM3 | BIN FIXED | (8) |
| ITEM4 | BIN FIXED | (15) |

METHOD FOR VALIDATING EQUIVALENT DATA STRUCTURES

FIELD OF THE INVENTION

The invention relates to application programming. In particular, the invention relates to a method, system, and computer program product for validating equivalent data structures.

BACKGROUND

Software products, such as IBM's Customer Information Control System (CICS) product suite provides sample copybooks in several programming languages, such as COBOL, Assembler and PL/1. A copybook provides data definitions for a program. For example, a program when executing may require a user to input their name and address. A copybook defines what type of data is required when inputting a name and address, i.e., name, first line of address and for each of these field names, the data type (character or integer) and the length of the input field. Each different type of programming language would require their own copybook because each programming language is unique and has its own constraints, constructs and data type representation, etc.

A copybook can also be used to map equivalent data structures in non-proprietary business languages, such as, WSDL (Web Service Definition Language) for web service operation to and from legacy systems. A proportion of copybooks are intended to be used to map data structures in order to access the data within the product, so that the offset of each data item within each equivalent data structure must be consistent across all the different types of programming language used by the product. Although compilers are able to provide maps of generated data structures, large data structures need meticulous analysis to ensure that the offsets of all data items are the same. Failure to spot an inconsistency error can lead to incorrect data being read by a program and storage being overlaid with invalid data.

BRIEF SUMMARY

The challenge for any developer is to ensure that a compiled output of a programming language is compatible with another compiled output of a different programming language. If the data structures within a compiled output are not the same then errors can occur when the complied program is run on a target machine. This is because an error can result in storage being overlaid with invalid data.

Viewed from a first aspect, embodiments of the invention provide a method for validating a data structure comprising: responsive to identifying a data structure in a first programming language, identifying an equivalent data structure in a second programming language; comparing a data definition of the data structure with a data definition of the equivalent data structure; determining an incompatibility between a compared data definition of the data structure and a compared data definition of the equivalent data structure; and responsive to determining an incompatibility, identifying a rule defining an action to be taken in order to correct the incompatibility.

In one embodiment, the method may detect the incompatibility in the data definition of the data structure, and the data definition may be in source code form. The method may comprise generating a message detailing the identified incompatibility and the identified mitigating action, and communicating to the initiating application for displaying. The identification of an equivalent data structure may comprise identifying whether the equivalent data structure performs an equivalent function as the identified data structure. The method may further generate a program listing from a source code editor or a compiler wherein the program listing comprises source code or compiled code.

The data definition may comprise a field name and the field name's associated characteristics. The method may identify the incompatibility as an error in a field type and an associated characteristic of the data structure when compared to the same field type in the second data structure.

Viewed from a second aspect, embodiments of the invention provide an apparatus for validating a data structure, comprising a mapping component for identifying an equivalent data structure in a second programming language, in dependence of a data structure in a first programming language; a comparing component for comparing a data definition of the data structure with a data definition of the equivalent data structure; a determining component for determining an incompatibility between a compared data definition of the data structure and a compared data definition of the equivalent data structure; and responsive to determining an incompatibility, a mitigation component for identifying a rule defining an action to be taken in order to correct the incompatibility.

Viewed from another aspect, embodiments of the invention provides a computer program product comprising computer program code to, when loaded into a computer system and executed, perform the steps of the method as described above.

BRIEF DESCRIPTION OF THE DRAWINGS

Embodiments of the invention will now be described by way of example only, with reference to the accompanying drawings in which.

DETAILED DESCRIPTION

Figure 1:
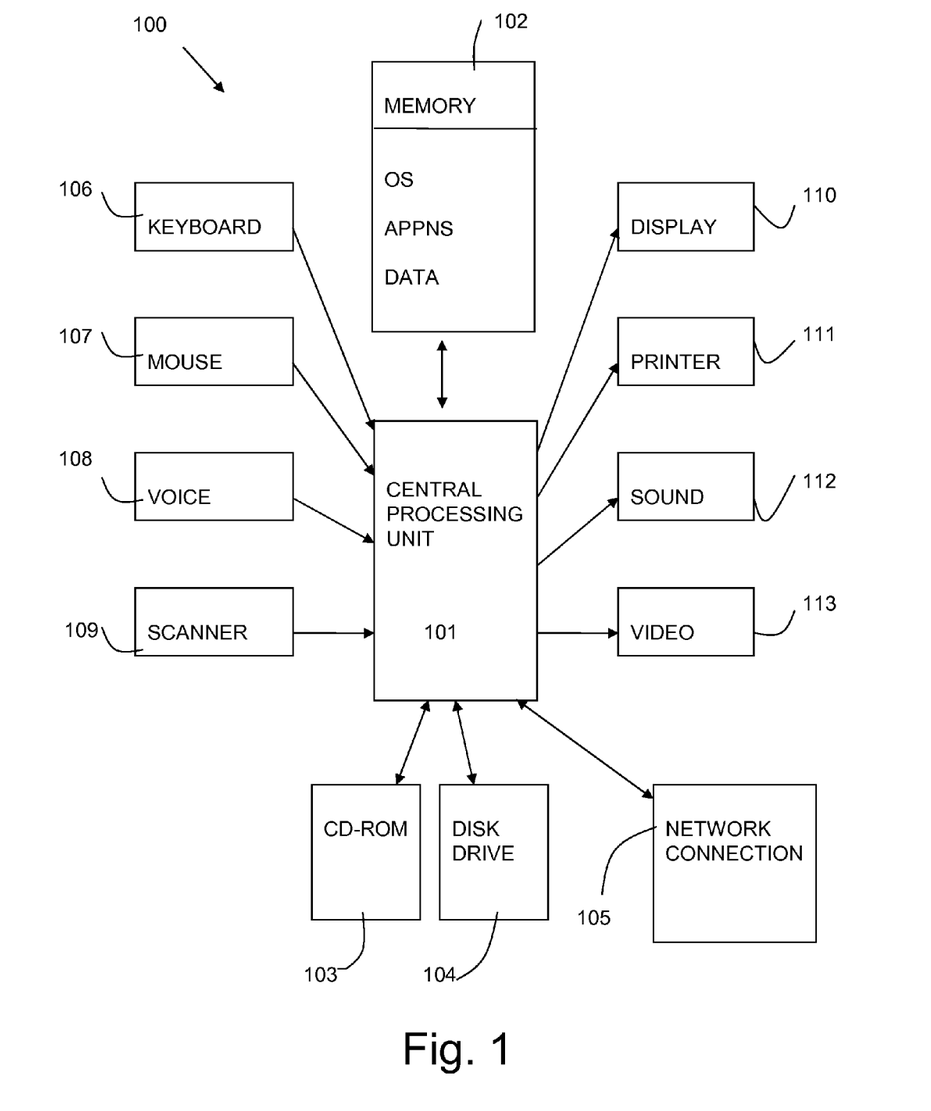
FIG. 1 is a data processing system in which an embodiment of the invention may be implemented.

FIG. 1 illustrates a typical data processing system 100 in which an embodiment of the invention may be provided.

The data processing system 100 comprises a central processing unit 101 with primary storage in the form of memory 102 (RAM and ROM). The memory 102 stores program information and data acted on or created by application programs. The program information includes the operating system code for the data processing system 100 and application code for applications running on the computer system 100. Secondary storage includes optical disk storage 103 and magnetic disk storage 104. Data and program information can also be stored and accessed from the secondary storage.

The data processing system 100 includes a network connection means 105 for interfacing the data processing system 100 to a network. The data processing system 100 may also have other external source communication means such as a fax modem or telephone connection.

The central processing unit 101 comprises inputs in the form of, as examples, a keyboard 106, a mouse 107, voice input 108, and a scanner 109 for inputting text, images, graphics or the like. Outputs from the central processing unit 101 may include a display means 110, a printer 111, sound output 112, video output 113, etc.

Figure 2:
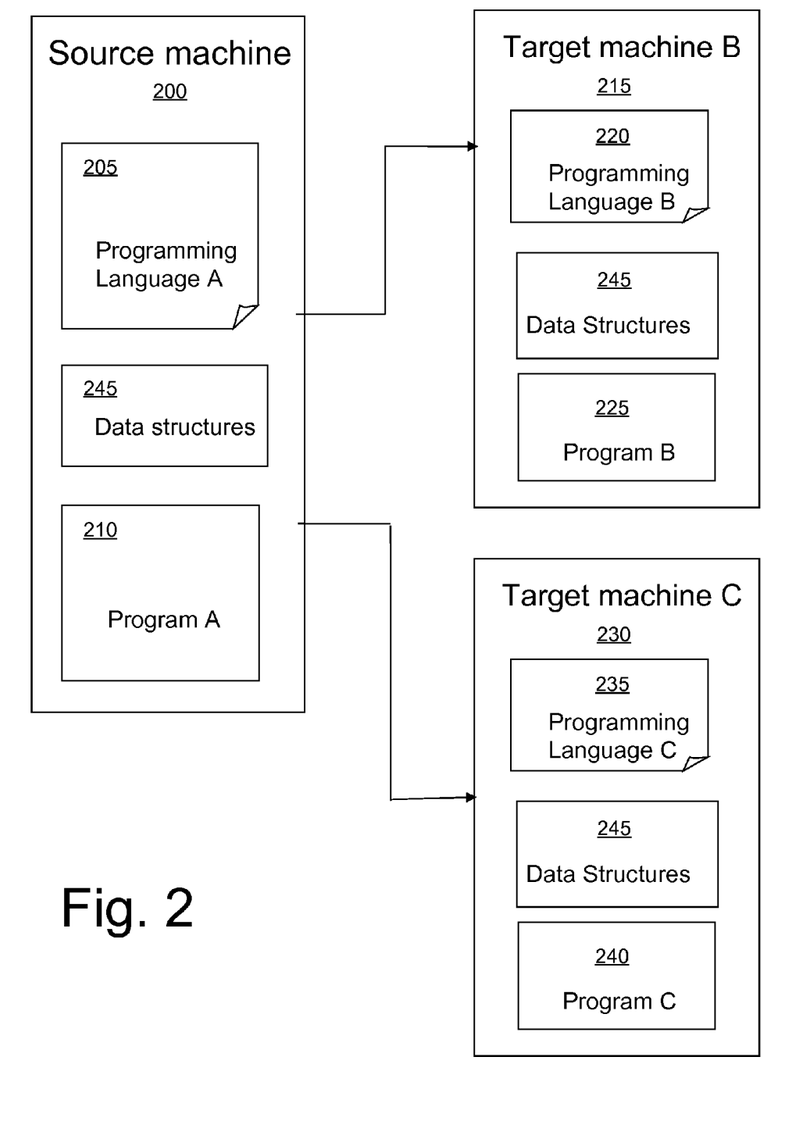
FIG. 2 is a block diagram depicting a source machine and a plurality of target machines as in known in the art.

Referring to FIG. 2, program 'A' (210) is written in programming language 'A' (205), for example, the assembly programming language and is running on a source machine 'A' (200).

Often, there is a need for this same program to be incorporated into another programming language (programming language 'B' (220) and 'C' (235)) for running on, for example, target machines 'B' (215) and 'C' (230). This is often because legacy systems need to be ported to new operating environments or data structures, in a non-proprietary business language, need to be mapped to and from their legacy systems.

In some programming languages copybooks are used to define data items, data item types and memory allocations, i.e., the length of a character string, the character length of an integer, etc. A copybook acts as a template of data definitions and defines the physical layout of a program's data. A copybook can be defined as a data structure (245) which comprises a number of data definitions.

In order for program 'A' (210) to be ported to target machines 'B' (215) and 'C' (230), there may be a need for program 'A' (210) to be written in programming language 'B' (220) and/or 'C' (235). Therefore the data structures (245) of program 'A' (210) must be replicated in the data structures (245) of the programming languages 'B' (220) and/or 'C' (235). If the data structures are not replicated, then program 'A' (210) may exhibit errors when run on target machine 'B' (215) and 'C' (230).

Figure 3:
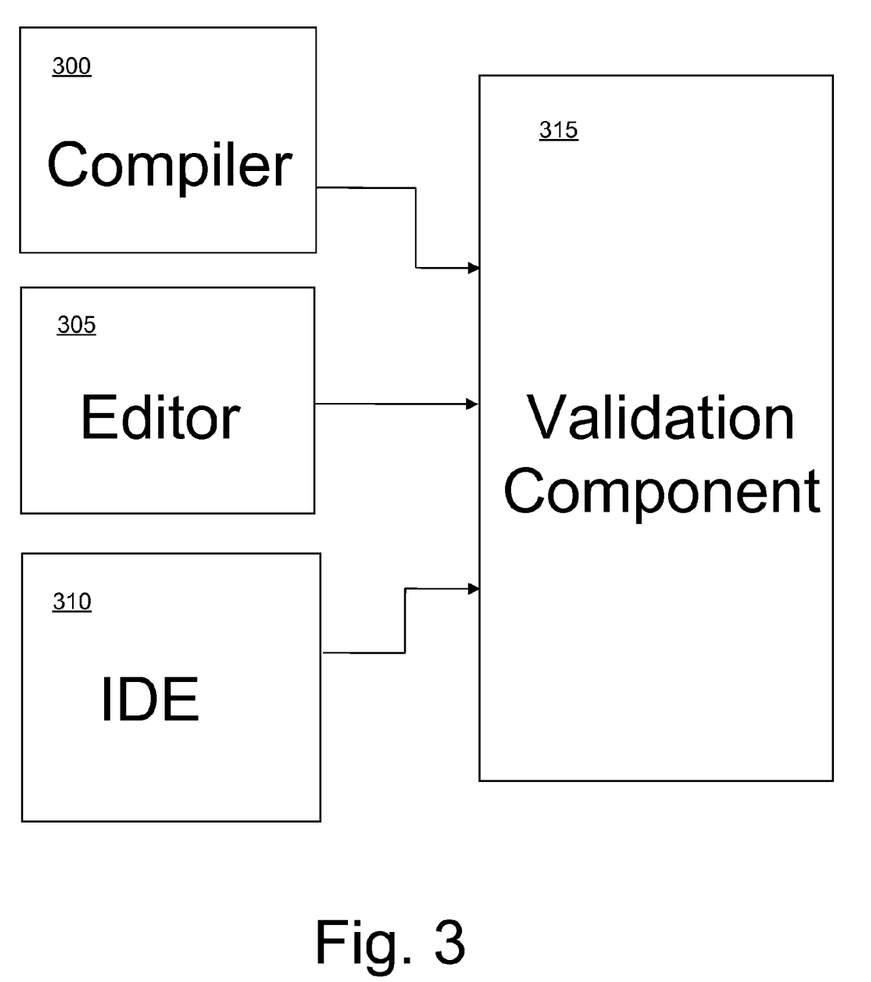
FIG. 3 is a block diagram depicting a validation component in accordance with an exemplary embodiment of the invention.

With reference to FIG. 3, a validation component (315) for validating data structures (245) referenced in the source code of different programming languages (205, 220, 235) is illustrated in accordance with an embodiment of the invention. The validation component (315) is operable for interfacing with a compiler application (300), an editor application (305) and/or an integrated development environment (310) (IDE). The validation component (315), in an embodiment, is a plug-in application operable with a compiler (300), an editor (305) or an IDE (310). Alternatively, the validation component (315) may be integrated into a compiler (300), a source code editor (305) or an IDE (310).

The validation component (315) may be initiated either by a command in the editor application (305), compiler application (300) or in the IDE (310). For clarity, these components will be termed 'initiating application'.

Figure 4:
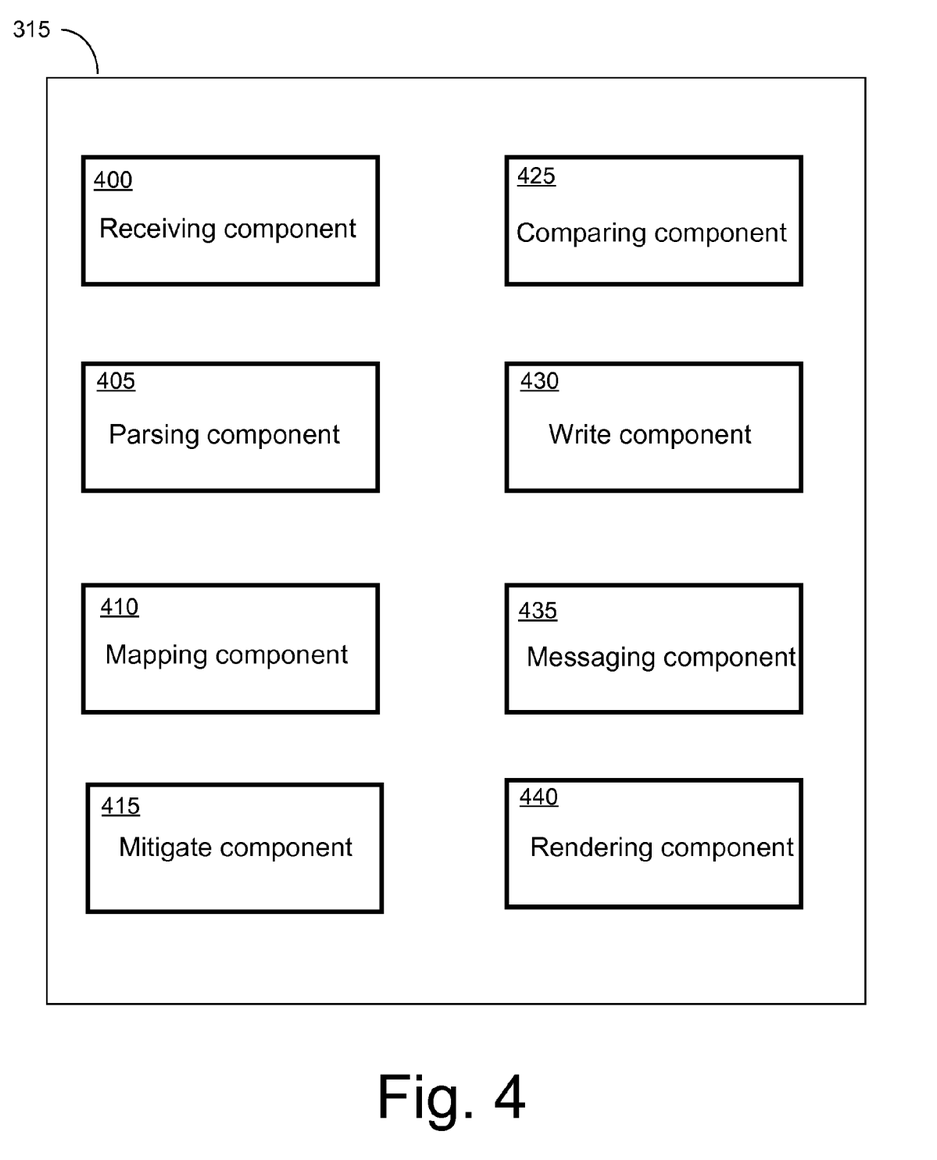
FIG. 4 is a block diagram detailing the sub-components of the validation component, of FIG. 3, in accordance with an exemplary embodiment of the invention.
Figure 5:
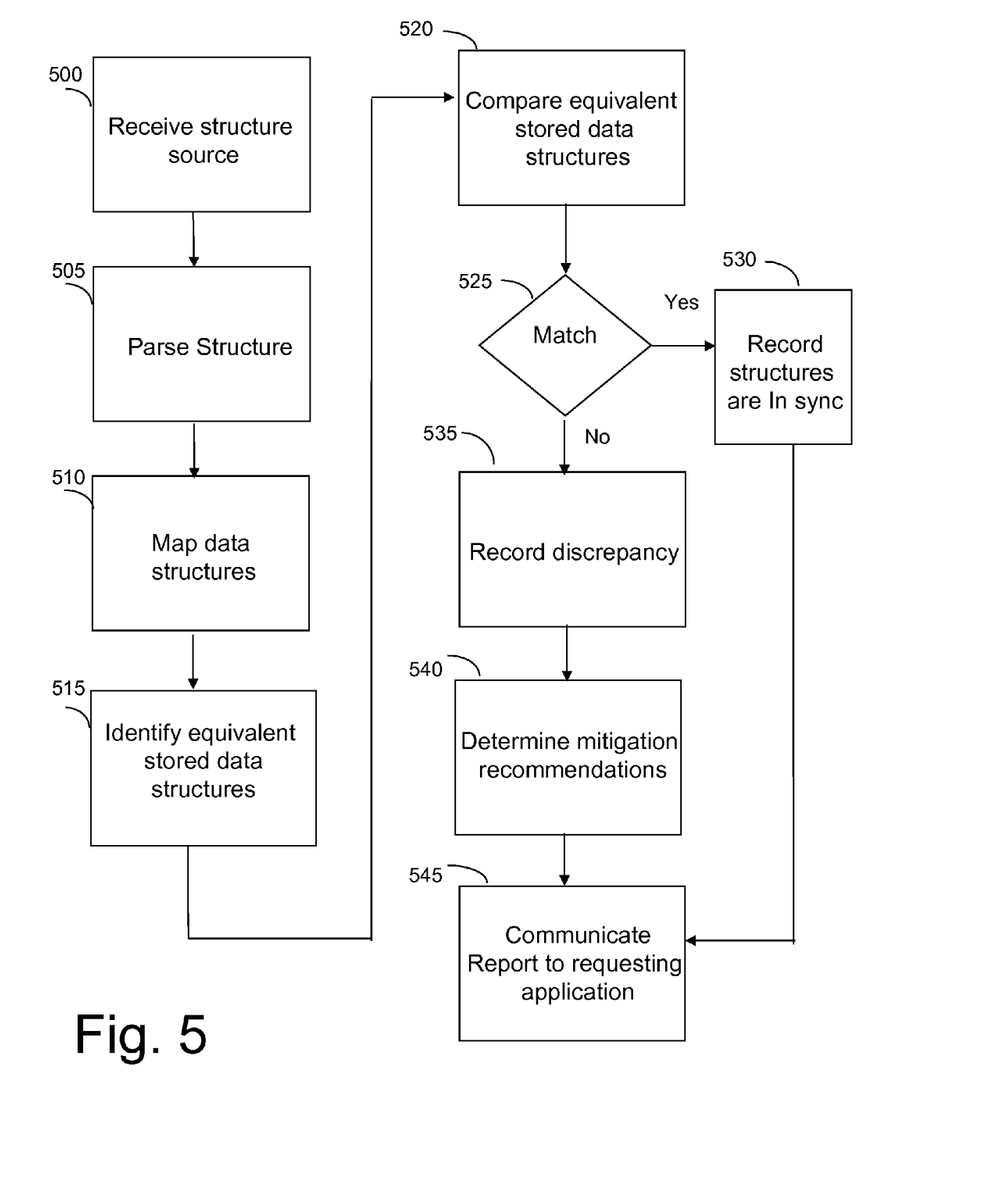
FIG. 5 is a flow chart depicting the process steps of the validation component in accordance with an exemplary embodiment of the invention.

The validation component (315) is shown in greater detail, with reference to FIG. 4 and FIG. 5. The validation component (315) comprises a number of sub-components that interface and interact with each other in order to provide the benefits of the present invention.

As already explained the validation component (315) is operable for receiving commands from an initiating application (300, 305, 310).

The validation component (315) is triggered by receiving a request (step 500) to analyse either copybook source code or compiled code listings (program listings) from either of the initiating applications (300, 305, 310).

A person skilled in the art will understand that a program listing may comprise source code written in a specific programming language, object code generated by the compiler from the source code (but before linking) and typically comprising one or more copybooks (data structures), comprising fields that are referenced by the program source code.

A person skilled in the art will also realise that the program listing may also comprise only the source code or any combination of the above.

Inclusion of a data structure (245) or other data template is usually denoted by a directive in the source code, a typical directive for an assembler copybook would be, for example, COPY.

Figure 6A:
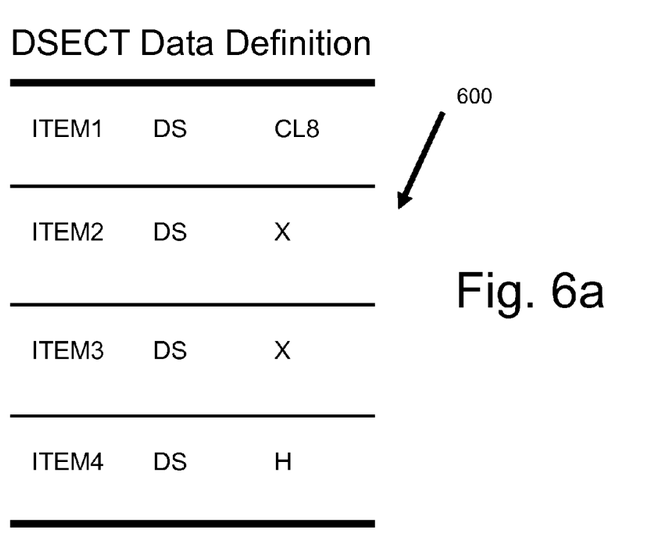
FIGS. 6a and 6b are examples of two types of data structures in accordance with an exemplary embodiment of the invention.

An example of a simplified data structure is shown with reference to FIG. 6a. The data structure is written in the assembly programming language and the data structure defines a number of data definitions which could, for example, be required by a program for validating a user's address. A data definition comprises a field name, a character type and a field length. For example, ITEM1 has been declared as a character string having a memory allocation of eight bytes. ITEM2 and ITEM3 have been declared as integers having a memory allocation of one byte each and finally ITEM4 has also been declared as an integer but having a memory allocation of two bytes.

As is known to a person skilled in the art, the assembler programming language is a low-level programming language which is designed to be able to program a particular CPU architecture. A particular CPU architecture will have its own memory allocation—one of these being what is known as byte addressable—that is successive bytes in memory are stored at consecutive bytes addresses 1, 2, 3 . . . . And any particular byte in memory can be individually read from or written to. Since a word is composed of four bytes, successive words are stored at consecutive even address multiples of four bytes: 0, 4, 8, 12. Thus, in order for the same program to be able to be ported to run in multiple programming languages, the memory allocations, data constructs and data definitions of the assembler program must be strictly adhered to. Otherwise when the program is executed on a target machine, data may be overwritten with invalid data and the executing program will output errors or unexpected results.

A receiving component (400) may receive the compiled output of a program—a program listing (step 500) and communicates the program listing to the parsing component (405) for analysis. The parsing component (405) may parse the program listing in order to identify a directive which identifies one or more data structures that are referenced in the program listing (step 505).

In an alternative embodiment, the receiving component (400) may receive the source of the copybook from a source code editor.

As part of the parsing process, the parsing component (405) may create a map (step 510), which details the data structure, a naming identifier of the data structure, each field's name, and the field name's associated characteristics. An example is illustrated below: Structure name: STRUCT1Structure field1: FIELDAStructure field1 len: 80Structure field1 type: numeric The parsing component (405) identifies all data structures (245) listed in the program listing and once the entire program listing has been parsed, the created map is communicated to the mapping component (410) for further analysis. A write component (430) may store this created map in a data store. Each time a map is created, the write component (430) stores the created map in a data store. Thus, a data store of previous mappings is created.

In order to validate a data structure (245), the validation component (315) must compare the data structure (245) of the created mapping with a functionally identical data structure (245) of a previous mapping stored in the data store. The mapping component (410) may begin by identifying the name of a first identified data structure (245) in the created mapping, i.e., STRUCT1, and determines if there is an equivalent data structure (step 515) in the required programming language, of a previous mapping stored in the data store.

An equivalent data structure is determined by the identifier of the first identified data structure being identical to an identifier of a data structure of a previous mapping, having identical characteristics.

Alternatively, an equivalent data structure may be located by using an equivalence algorithm in order to determine that a previous data structure comprises the same fields and data types as the first identified data structure—thus capable of providing the same functionality.

If the mapping component (410) is able to locate an equivalent data structure, then the comparing component (425) receives the generated mapping and the identified equivalent data structure from the mapping component (410). The mapping component (410) may retrieve the identified equivalent data structure from the data store.

Figure 6B:
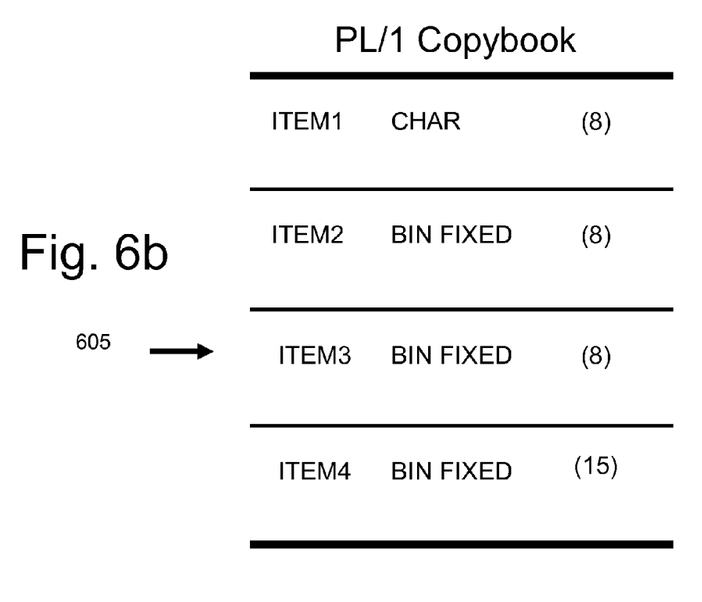

For example and with reference to FIGS. 6a and 6b, the comparing component (425) compares the first identified data structure (245) in the created mapping (the assembler data structure of FIG. 6a) with the PL/1 data structure of FIG. 6b. As a person skilled in the art will realise PL/1, as with any programming language has its own individual constructs, constraints and data structure formats.

The comparing component (425) identifies, in the PL/1 structure, that ITEM1 (605) is declared as a character string having a memory allocation of eight bytes, ITEM2 and ITEM3 (605) are declared as integer values having a memory allocation of two bytes each, and ITEM4 is an integer value having two bytes (605).

The comparing component (425) begins by parsing each data field and its associated characteristics of the identified data structure of the generated mapping with the field name of the data structure of the identified generated mapping received from the mapping component.

The comparing component (425) determines if there is a discrepancy (step 525) between field names and their associated characteristics, i.e., non identical field names and associated characteristics. If a discrepancy is identified, an alert is generated and communicated to a mitigation component (415) for further processing (step 535). If no discrepancy is located a message is generated stating that the data structures are synchronized and communicated to the messaging component (435) for displaying via the rendering component (440) via the initiating application's GUI, or equivalent appropriate output destination.

Using the example of FIG. 6b, the comparing component (425) identifies that ITEM2 and ITEM3 of the PL/1 copybook have been incorrectly declared as BIN FIXED as the developer intended the declarations to be one byte fields. This information informs the PL/1 compiler that each item declaration must occupy two bytes of storage each. However, referring to the assembler data structure of FIG. 6a, ITEM2 and ITEM3 actually only occupy one byte of storage each. Therefore a PL/1 program attempting to access ITEM4 will identify ITEM4 is storage as located at twelve bytes into the data structure and not the correct value of ten bytes into the equivalent assembler structure.

Therefore, the assembler data structure of FIG. 6a and the PL/1 copybook of FIG. 6b are incompatible as the PL/1 copybook when referenced by a PL/1 program executed on a target machine may generate a unexpected errors. Thus the comparing component (425) in combination with the write component records the discrepancy (step 535) and moves onto the next data field in the data structure until all data field and their associated characteristics have been analysed and compared.

Presented with this discrepancy information, a mitigation component (415) analyses the identified incompatibility and performs a search in a data store for information that describes how to mitigate the incompatibility (step 540). The data store, in an embodiment of the invention, may be a rule engine which stores rules for identified resolutions to identified incompatibilities.

The mitigation component (415) comprises rules and predicates which provide recommendations or resolutions of ways in which to modify the structure definitions (245) to bring them in synch with each other. The mitigation component (415) receives, from the comparing component (425), data which describes the difference between the first mapping and the second mapping. The differences may take the form of:

Fields declared in a different order, in the first mapping, that are declared in a different order in the second mapping.

Fields that are declared in the correct order, in the first mapping, but have inconsistent declared character lengths Fields that are present in the first mapping but not present in the second mappings.

Once the mitigation component (415), has determined a resolution to the incompatibility, a messaging component (435), in combination with a rendering component (440) reports the resolution back to the user via a GUI, or equivalent or appropriate output destination of the initiating component (step 545). For example, with reference to step 520 of FIG. 5, the comparing component (425) identifies that ITEM 2 in the PL/1 data structure is declared as a two byte field, but its equivalent declaration in the assembler data structure is a one byte field—the mitigation component (415) identifies that the solution is to 'review the PL/1 data structures and to change their content as appropriate to ensure that ITEM2 is declared correctly'. This information is communicated to the messaging component (435) for sending to the rendering component (440) for rendering in the GUI of the initiating application (300,305,310) or equivalent or appropriate output destination.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for validating a data structure, comprising:
responsive to identifying a data structure in a first programming language, identifying an equivalent data structure in a second programming language;
comparing a data definition of the data structure with a data definition of the equivalent data structure;
determining whether there is an incompatibility between a compared data definition of the data structure and a compared data definition of the equivalent data structure by analyzing characteristics of all data fields in a generated assembler data structure of the first programming language corresponding to the data structure in the first programming language and corresponding data fields in a generated assembler data structure of the second programming language corresponding to the equivalent data structure in the second programming language, wherein the generated assembler data structures of the first and the second programming languages are allocated in memory;
responsive to determining an incompatibility between the generated assembler data structure of the first programming language and the generated assembler data structure of the second programming language, generating an alert and communicating the alert to a mitigation component to identify a rule which defines an action to be taken in order to correct the incompatibility, wherein a messaging component and a rendering component reports the action to a user via a graphical user interface; and
responsive to determining a compatibility between the generated assembler data structure of the first programming language and the generated assembler data structure of the second programming language, generating a message that the data structure in the first programming language and the equivalent data structure in the second programming language are synchronized, and communicating the message to the messaging component to display via the graphical user interface.

2. A method as claimed in claim 1, further comprising generating a message detailing the identified incompatibility and the identified mitigating action, and communicating to the initiating application for displaying.

3. A method as claimed in claim 1, wherein identification of an equivalent data structure further comprises identifying whether the equivalent data structure performs an equivalent function as the identified data structure.

4. A method as claimed in claim 1, wherein the incompatibility is identified as an error in a field type and an associated characteristic of the data structure when compared to the same field type in the second data structure.

5. The method of claim 1, wherein the determined incompatibility includes fields of the data structure declared in one order in the first programming language and declared in another order in the equivalent data structure in the second programming language.

6. The method of claim 1, wherein the determined incompatibility includes fields of the data structure that are declared in a correct order in the first programming language but have inconsistent declared character lengths.

7. The method of claim 1, wherein the determined incompatibility includes fields of the data structure that are present in the first programming language but are not present in the equivalent data structure in the second programming language.

8. An apparatus for validating a data structure, comprising:
a processor comprising a central processing unit;
a mapping component that executes operations on the processor for identifying an equivalent data structure in a second programming language, in response to the mapping component identifying a data structure in a first programming language;
a comparing component for comparing a data definition of the data structure with a data definition of the equivalent data structure;
a determining component for determining whether there is an incompatibility between a compared data definition of the data structure and a compared data definition of the equivalent data structure by analyzing characteristics of all data fields in a generated assembler data structure of the first programming language corresponding to the data structure in the first programming language and corresponding data fields in a generated assembler data structure of the second programming language corresponding to the equivalent data structure in the second programming language, wherein the generated assembler data structures of the first and the second programming languages are allocated in memory;
responsive to determining an incompatibility between the generated assembler data structure of the first programming language and the generated assembler data structure of the second programming language, generating an alert and communicating the alert to a mitigation component to identify a rule which defines an action to be taken in order to correct the incompatibility, wherein a messaging component and a rendering component reports the action to a user via a graphical user interface; and
responsive to determining a compatibility between the generated assembler data structure of the first programming language and the generated assembler data structure of the second programming language, generating a message that the data structure in the first programming language and the equivalent data structure in the second programming language are synchronized, and communicating the message to the messaging component to display via the graphical user interface.

9. An apparatus as claimed in claim 8, further comprising a messaging component for generating a message detailing the identified incompatibility and the identified mitigating action and communicating to the initiating application for displaying.

10. An apparatus as claimed in claim 8, wherein the mapping component identifies whether the equivalent data structure performs an equivalent function as the identified data structure.

11. An apparatus as claimed in claim 8, wherein the incompatibility is identified as an error in a field type and an associated characteristic of the data structure when compared to the same field type in the second data structure.

12. The apparatus of claim 8, wherein the determined incompatibility includes fields of the data structure declared in one order in the first programming language and declared in another order in the equivalent data structure in the second programming language.

13. The apparatus of claim 8, wherein the determined incompatibility includes fields of the data structure that are declared in a correct order in the first programming language but have inconsistent declared character lengths.

14. The apparatus of claim 8, wherein the determined incompatibility includes fields of the data structure that are present in the first programming language but are not present in the equivalent data structure in the second programming language.

15. A computer program product comprising a non-transitory computer readable storage medium having computer readable program code embodied therewith, the computer readable program code comprising:
  computer readable program code configured to identify a data structure in a first programming language and identify an equivalent data structure in a second programming language;
  computer readable program code configured to compare a data definition of the data structure with a data definition of the equivalent data structure;
  computer readable program code configured to determine whether there is an incompatibility between a compared data definition of the data structure and a compared data definition of the equivalent data structure by analyzing characteristics of all data fields in a generated assembler data structure of the first programming language corresponding to the data structure in the first programming language and corresponding data fields in a generated assembler data structure of the second programming language corresponding to the equivalent data structure in the second programming language, wherein the generated assembler data structures of the first and the second programming languages are allocated in memory;
  responsive to determining an incompatibility between the generated assembler data structure of the first programming language and the generated assembler data structure of the second programming language, generating an alert and communicating the alert to a mitigation component to identify a rule which defines an action to be taken in order to correct the incompatibility, wherein a messaging component and a rendering component reports the action to a user via a graphical user interface; and
  responsive to determining a compatibility between the generated assembler data structure of the first programming language and the generated assembler data structure of the second programming language, generating a message that the data structure in the first programming language and the equivalent data structure in the second programming language are synchronized, and communicating the message to the messaging component to display via the graphical user interface.

16. A computer program product as claimed in claim 15, further comprising computer readable program code configured to identify whether the equivalent data structure performs an equivalent function as the identified data structure.

17. The computer program product of claim 15, wherein the determined incompatibility includes fields of the data structure declared in one order in the first programming language and declared in another order in the equivalent data structure in the second programming language.

18. The computer program product of claim 15, wherein the determined incompatibility includes fields of the data structure that are declared in a correct order in the first programming language but have inconsistent declared character lengths.

19. The computer program product of claim 15, wherein the determined incompatibility includes fields of the data structure that are present in the first programming language but are not present in the equivalent data structure in the second programming language.

* * * * *